United States Patent
Lee et al.

(10) Patent No.: US 11,843,145 B2
(45) Date of Patent: Dec. 12, 2023

(54) APPARATUS FOR REDUCING EXHAUST HYDROGEN CONCENTRATION IN A FUEL CELL SYSTEM AND A METHOD THEREOF

(71) Applicants: HYUNDAI MOTOR COMPANY, Seoul (KR); KIA MOTORS CORPORATION, Seoul (KR)

(72) Inventors: Won Uk Lee, Hwaseong-si (KR); Nam Woo Lee, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 430 days.

(21) Appl. No.: 16/914,995

(22) Filed: Jun. 29, 2020

(65) Prior Publication Data

US 2021/0159526 A1 May 27, 2021

(30) Foreign Application Priority Data

Nov. 25, 2019 (KR) ........................ 10-2019-0152535

(51) Int. Cl.
 *H01M 8/0444* (2016.01)
 *H01M 8/04089* (2016.01)
 (Continued)

(52) U.S. Cl.
 CPC ..... *H01M 8/04805* (2013.01); *H01M 8/0438* (2013.01); *H01M 8/0447* (2013.01); *H01M 8/04089* (2013.01); *H01M 8/04201* (2013.01); *H01M 8/04761* (2013.01)

(58) Field of Classification Search
 CPC ............... H01M 8/04; H01M 8/04298; H01M 8/04313; H01M 8/0438; H01M 8/04395;
 (Continued)

(56) References Cited

U.S. PATENT DOCUMENTS

| 8,652,698 B2 | 2/2014 | Ota et al. | |
|---|---|---|---|
| 2005/0058861 A1* | 3/2005 | Pettit | H01M 8/0662 |
| | | | 429/441 |

(Continued)

FOREIGN PATENT DOCUMENTS

| CN | 101512816 A | 8/2009 |
|---|---|---|
| JP | 2006324213 A | 11/2006 |

(Continued)

OTHER PUBLICATIONS

Office Action cited in Chinese patent application No. 202010665086.5; dated Sep. 13, 2023; 9 pp.

*Primary Examiner* — Jonathan Crepeau
*Assistant Examiner* — Jacob Buchanan
(74) *Attorney, Agent, or Firm* — LEMPIA SUMMERFIELD KATZ LLC (57) ABSTRACT

An apparatus and method for reducing an exhaust hydrogen concentration in a fuel cell system includes a first air cut-off valve (ACV) blocking ambient air supplied to a cathode, a second ACV blocking exhaust hydrogen discharged from the cathode, and an air suction valve (ASV) operating in a first mode connecting the cathode and an intake port of an air compressor and in a second mode blocking connection between the cathode and the intake port of the air compressor. The apparatus also includes a controller for operating the ASV in the first mode to store air of the cathode while the first ACV is opened and the second ACV is closed when hydrogen is supplied to an anode, and for operating the ASV in the second mode to discharge ambient air through an exhaust line while the first ACV is opened and the second ACV is opened when ambient air is supplied to the cathode.

9 Claims, 4 Drawing Sheets

(51) Int. Cl.
*H01M 8/04082* (2016.01)
*H01M 8/04746* (2016.01)
*H01M 8/04791* (2016.01)
*H01M 8/0438* (2016.01)

(58) Field of Classification Search
CPC ............ H01M 8/0441; H01M 8/0444; H01M 8/04455; H01M 8/0447; H01M 8/04694; H01M 8/04746; H01M 8/04761; H01M 8/04776; H01M 8/04791; H01M 8/04805
See application file for complete search history.

(56) References Cited

U.S. PATENT DOCUMENTS

| | | | |
|---|---|---|---|
| 2008/0299426 A1* | 12/2008 | Ando | H01M 8/04776 429/441 |
| 2009/0098426 A1* | 4/2009 | Tsuchiya | H01M 8/0438 429/410 |
| 2010/0003549 A1 | 1/2010 | Ota et al. | |
| 2010/0285379 A1* | 11/2010 | Schrieber | H01M 8/0488 429/432 |
| 2010/0304239 A1* | 12/2010 | Perry | H01M 8/04225 429/429 |
| 2013/0034787 A1* | 2/2013 | Miyata | H01M 8/04798 429/429 |
| 2013/0137007 A1 | 5/2013 | Lee et al. | |
| 2016/0141663 A1 | 5/2016 | Kim | |
| 2018/0294497 A1 | 10/2018 | Asai | |

FOREIGN PATENT DOCUMENTS

| | | |
|---|---|---|
| JP | 4882247 B2 | 2/2012 |
| KR | 20160057117 A | 5/2016 |
| KR | 101759141 B1 | 7/2017 |

* cited by examiner

APPARATUS FOR REDUCING EXHAUST HYDROGEN CONCENTRATION IN A FUEL CELL SYSTEM AND A METHOD THEREOF

CROSS-REFERENCE TO RELATED APPLICATION

This application claims the benefit of priority to Korean Patent Application No. 10-2019-0152535, filed in the Korean Intellectual Property Office on Nov. 25, 2019, the entire contents of which are incorporated herein by reference.

TECHNICAL FIELD

The present disclosure relates to a technique for reducing a concentration of hydrogen (exhaust hydrogen) discharged through an exhaust line from a cathode of a fuel cell stack.

BACKGROUND

A fuel cell system is a kind of power generation system that does not convert chemical energy possessed by fuel into heat by combustion. A fuel cell system converts chemical energy directly into electrical energy in a fuel cell stack.

The fuel cell system includes largely a fuel cell stack generating electrical energy, a hydrogen supplier supplying hydrogen as fuel to the fuel cell stack, an air supplier supplying air (oxygen), which is an oxidant required for an electrochemical reaction, to the fuel cell stack, a thermal management system (TMS) discharging reaction heat of the fuel cell stack to the outside of the system and controlling an operating temperature of the fuel cell stack to perform water management functions, and a fuel cell system controller controlling an overall operation of the fuel cell system.

The above-described fuel cell system generates electricity by reacting hydrogen, which is fuel, with oxygen in the air, and discharges heat and water as reaction by-products.

The most popular fuel cell type for a vehicle is a proton exchange membrane fuel cell (PEMFC) (or a polymer electrolyte membrane fuel cell), which has the highest power density among fuel cells, and has a fast start-up time and a fast power conversion reaction time due to a low operating temperature.

The fuel cell stack mounted in the proton exchange membrane fuel cell includes a membrane electrode assembly (MEA) including a polymer electrolyte membrane in which hydrogen ions move and catalyst layers attached to opposite sides of the polymer electrolyte membrane, where an electrochemical reaction occurs. The fuel cell stack also includes a gas diffusion layer (GDL), which serves to evenly distribute reaction gases and transfer a generated electricity, and a gasket and fastener to maintain airtightness and proper tightening pressure of reaction gases and cooling water. The fuel cell stack also includes a bipolar plate to move the reaction gases and cooling water, and to generate a current by a fuel cell reaction where hydrogen and oxygen are supplied.

The fuel cell system should maintain a concentration of the hydrogen gas in the exhaust gas below a specific reference value to minimize risk of explosion or fire due to the hydrogen gas contained in the exhaust gas.

However, the hydrogen gas discharged through a hydrogen purge valve of the fuel cell system and the hydrogen gas in a cathode generated due to a cross over phenomenon may be discharged through an exhaust line. The crossover phenomenon refers to a phenomenon in which the hydrogen gas of an anode diffuses to the cathode due to a difference in gas concentration between the anode and the cathode in the fuel cell stack.

In accordance with a global technical regulation (GTR) that is currently applied worldwide, a permissive concentration of hydrogen gas emitted from the fuel cell system should be less than 8%, and an average concentration measured over 3 seconds should not exceed 4%.

Therefore, a fuel cell vehicle using hydrogen as a fuel should always discharge the exhaust gas having a hydrogen concentration below a certain level under all operating conditions.

The above information disclosed in this section is only for enhancement of understanding of the background of the disclosure and therefore it may contain information that does not form the prior art that is already known in this country to a person of ordinary skill in the art.

SUMMARY

The present disclosure has been made to solve the above-mentioned problems occurring in the prior art while advantages achieved by the prior art are maintained intact.

An aspect of the present disclosure provides an apparatus and method for reducing an exhaust hydrogen concentration in a fuel cell system capable of reducing the hydrogen concentration in an air discharged through an exhaust line where, when hydrogen is supplied to a fuel cell stack, an air cut-off valve (ACV) adjacent to an inlet of a cathode is opened, an ACV adjacent to an outlet of the cathode is closed, and an air suction valve (ASV) is operated in a first mode to store an air of the cathode in an air tank. When an ambient air is supplied to the cathode, the ACV adjacent to the inlet of the cathode maintains an opened state, the ACV adjacent to the outlet of the cathode is opened, and the ASV is operated in a second mode to discharge the ambient air, which is supplied to the cathode, to the outside through the exhaust line.

The technical problems to be solved by the present disclosed concept are not limited to the aforementioned problems, and any other technical problems not mentioned herein are clearly understood from the following description by those having ordinary skill in the art to which the present disclosure pertains.

According to an aspect of the present disclosure, an apparatus for reducing an exhaust hydrogen concentration in a fuel cell system may include a first air cut-off valve (ACV) that blocks an ambient air supplied to a cathode, a second ACV that blocks exhaust hydrogen discharged from the cathode, and an air suction valve (ASV) that operates in a first mode, which connects the cathode and an intake port of an air compressor, and in a second mode, which blocks a connection between the cathode and the intake port of the air compressor. The apparatus may also include a controller that operates the ASV in the first mode to store air of the cathode while the first ACV is opened and the second ACV is closed when hydrogen is supplied to an anode, and operates the ASV in the second mode to discharge the ambient air supplied to the cathode through an exhaust line while the first ACV is kept opened and the second ACV is opened when the ambient air is supplied to the cathode.

The air compressor may suck the air of the cathode to store the air in an air tank when the ASV operates in the first mode. The controller may control the air compressor to suck the air of the cathode for a reference time. In addition, the controller may control the air compressor to store the ambient air in the air tank.

The apparatus for reducing an exhaust hydrogen concentration in a fuel cell system may further include a concentration sensor located in the exhaust line connecting the cathode to the second ACV to measure a concentration of hydrogen in the cathode.

The controller may allow the concentration of hydrogen in the cathode to be lowered when the concentration of hydrogen measured by the concentration sensor exceeds a reference concentration.

The apparatus for reducing an exhaust hydrogen concentration in a fuel cell system may further include a pressure sensor measuring a pressure of the air tank and an air exhaust valve (AEV) discharging air in the air tank to outside the air tank.

The controller may allow the AEV to be opened to lower the pressure of the air tank when the pressure measured by the pressure sensor exceeds a reference pressure.

According to an aspect of the present disclosure, a method of reducing an exhaust hydrogen concentration in a fuel cell system may include connecting a cathode to an intake port of an air compressor while a first air cut-off valve (ACV) is opened and a second ACV is closed when hydrogen is supplied to an anode, operating the air compressor to store air of the cathode in an air tank, and blocking a connection between the cathode and the intake port of the air compressor while the first ACV is kept opened and the second ACV is open, when ambient air is supplied to the cathode, to discharge the ambient air supplied to the cathode through an exhaust line.

The storing of the air of the cathode in the air tank may operate the air compressor for a reference time.

Furthermore, the connecting of the cathode to the intake port of the air compressor may further include measuring a concentration of hydrogen in the cathode and connecting the cathode and the intake port of the air compressor while the first ACV is open and the second ACV is closed, when the measured concentration of hydrogen exceeds a reference concentration.

In addition, the storing of the air of the cathode in the air tank may further include measuring a pressure of the air tank and discharging the air in the air tank to outside the air tank when the measured pressure exceeds a reference pressure.

According to an aspect of the present disclosure, a method of reducing an exhaust hydrogen concentration in a fuel cell system may include connecting a cathode to an intake port of an air compressor while a first air cut-off valve (ACV) is opened and a second ACV is closed when hydrogen is supplied to an anode, lowering a pressure of an air tank to a reference pressure, operating the air compressor to store air of the cathode in the air tank, blocking a connection between the cathode and the intake port of the air compressor while the first ACV is kept opened and the second ACV is open, when ambient air is supplied to the cathode, to discharge the ambient air supplied to the cathode through an exhaust line, and connecting the intake port of the air compressor to the ambient air.

The storing of the air of the cathode in the air tank may operate the air compressor for a reference time.

Furthermore, the connecting of the cathode to the intake port of the air compressor may further include supplying hydrogen to the anode, measuring a concentration of hydrogen in the cathode, and connecting the cathode and the intake port of the air compressor while the first ACV is open and the second ACV is closed, when the measured concentration of hydrogen exceeds a reference concentration.

BRIEF DESCRIPTION OF THE DRAWINGS

The above and other objects, features and advantages of the present disclosure are more apparent from the following detailed description taken in conjunction with the accompanying drawings.

DETAILED DESCRIPTION

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions has been ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

Figure 1:
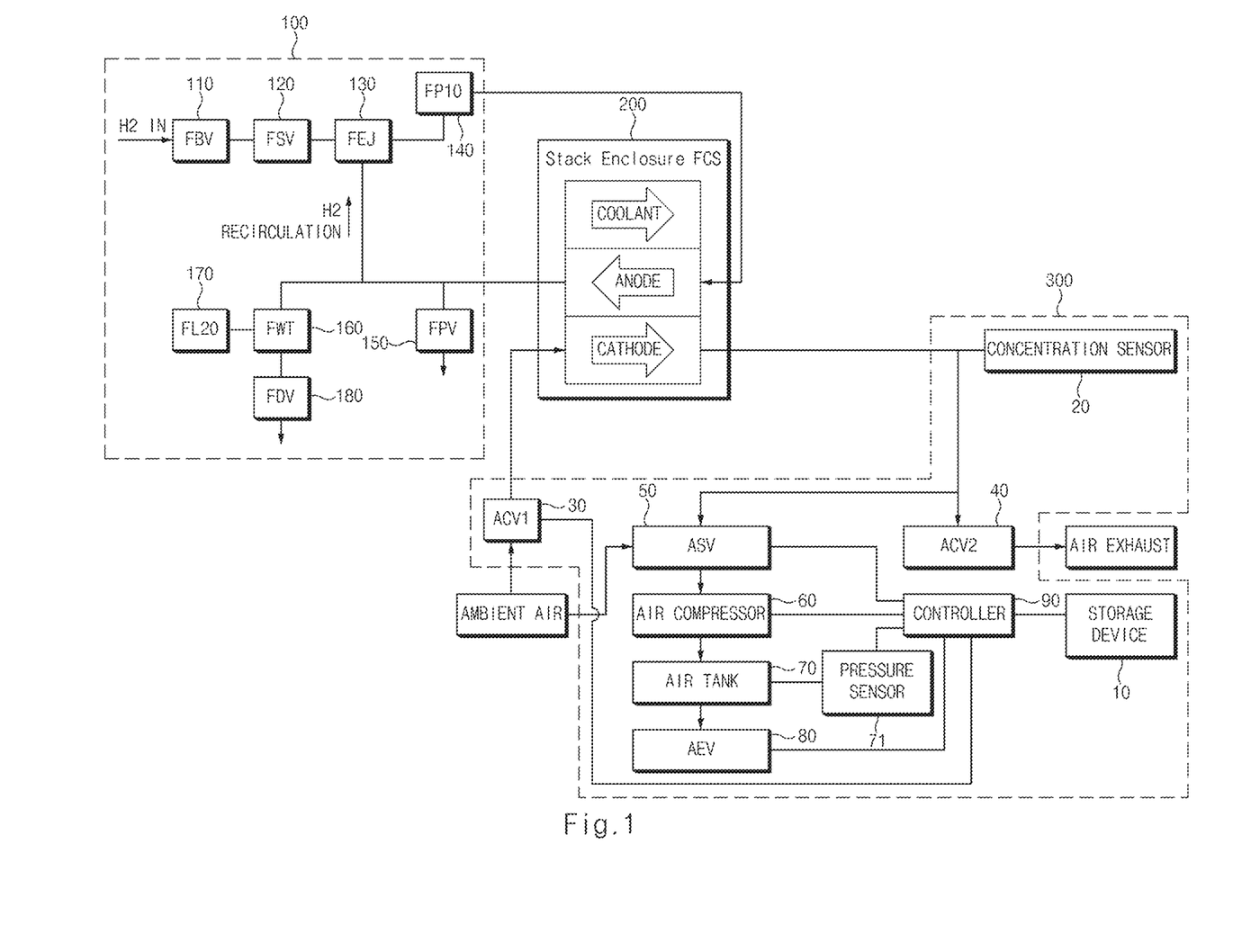
FIG. 1 is a block diagram of an apparatus for reducing an exhaust hydrogen concentration in a fuel cell system according to an embodiment of the present disclosure.

FIG. 1 is a block diagram of an apparatus for reducing an exhaust hydrogen concentration in a fuel cell system according to an embodiment of the present disclosure.

As illustrated in FIG. 1, an apparatus 300 for reducing an exhaust hydrogen concentration in a fuel cell system according to an embodiment of the present disclosure may include a storage device 10, a concentration sensor 20, an air cut-off valve 1 (ACV1) 30, an ACV2 40, an air suction valve (ASV) 50, an air compressor 60, an air tank 70, a pressure sensor 71, an air exhaust valve (AEV) 80, and a controller 90. In this example, each component may be combined with each other to be implemented as one, or some components may be omitted depending on a method of implementing the apparatus 300 for reducing exhaust hydrogen concentration in the fuel cell system according to an embodiment of the present disclosure.

The above-described components are described, respectively. The storage device 10 may store various logics, algorithms and programs required in a process, where, when hydrogen is supplied to a fuel cell stack 200, the ACV1 30 is opened, the ACV2 40 is closed, and the ASV 50 operates in a first mode to store air of the cathode in the air tank 70. When ambient air is supplied to the cathode, the ACV1 30 of the cathode maintains the opened state, the ACV2 40 is opened, and the ASV 50 operates in a second mode to discharge the ambient air, which is supplied to the cathode, to the outside through an exhaust line. In this example, the exhaust line means a passage from an output terminal of the cathode to the outside (i.e., outside the apparatus 300) through the ACV2 40.

When the hydrogen is supplied to the fuel cell stack 200, the storage device 10 may store a reference concentration value (e.g., 1%) used as a condition for determining whether or not to reduce the concentration of hydrogen in the cathode. The reference concentration value may be set to a value that may satisfy the GTR (Global Technical Regulation) regulations.

The storage device 10 may store a reference pressure value (e.g., 9.5 bar) used as a condition for determining whether air in the air tank 70 is discharged. The air tank 70 has an appropriate pressure (e.g., 10 bar).

The storage device 10 may store a reference time (e.g., 10 seconds) for limiting a time for operating the ASV 50 in the first mode.

The storage device 10 may include at least one type of storage medium of a memory having a flash memory type, hard disk type, micro type, and card type (e.g., secure digital (SD) card or extreme digital (XD) card), and a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The concentration sensor 20 may be located in the exhaust line connecting the cathode of the fuel cell stack 200 to the ACV2 40 to measure the concentration of hydrogen in the cathode.

The ACV1 30 may serve to block the ambient air supplied to the cathode of the fuel cell stack 200.

The ACV2 40 may serve to block the exhaust hydrogen discharged from the cathode of the fuel cell stack 200.

The ASV 50 may operate in the first mode connecting the cathode of the fuel cell stack 200 to the intake port of the air compressor 60 or in the second mode blocking the connection between the cathode of the fuel cell stack 200 and the intake port of the air compressor 60.

When an embodiment of the present disclosure is applied to a bus or truck, the ASV 50, which is a three-way valve, may operate in the first mode connecting the cathode of the fuel cell stack 200 to the intake port of the air compressor 60 or in the second mode connecting the ambient air to the intake port of the air compressor 60. In this example, the ASV 50 may be implemented as a first valve connecting the cathode of the fuel cell stack 200 to the intake port of the air compressor 60 and a second valve connecting the ambient air to the intake port of the air compressor 60.

The air compressor 60 may serve to suck the air of the cathode of the fuel cell stack 200 and to store the air in the air tank 70 when the ASV 50 operates in the first mode and may serve to suck the ambient air and to store the ambient air in the air tank 70 when the ASV 50 operates in the second mode. When an embodiment of the present disclosure is applied to a bus or truck, the air compressor 60 may be implemented as an air compressor that supplies compressed air in the bus or truck.

The air tank 70 may serve to store the air supplied from the air compressor 60 in the cathode of the fuel cell stack 200 or the ambient air. When an embodiment of the present disclosure is applied to a bus or truck, the air tank 70 may be implemented as an air tank that stores compressed air in the bus or truck.

The pressure sensor 71 may measure a pressure of the air tank 70. When an embodiment of the present disclosure is applied to a bus or truck, the pressure sensor 71 may be implemented as a sensor for measuring a pressure of compressed air in the bus or truck.

The AEV 80 may discharge the air in the air tank 70 to the outside. When an embodiment of the present disclosure is applied to a bus or truck, the AEV 80 may be implemented as a valve that supplies compressed air to a brake system in the bus or truck.

The controller 90 performs overall control so that each component is capable of performing its functions normally. The controller 90 may be implemented in a form of hardware, software, or a combination of hardware and software. The controller 90 may be implemented as a microprocessor but is not limited thereto.

In particular, the controller 90 may perform various controls in a process where, when the hydrogen is supplied to the fuel cell stack 200 (i.e., when the hydrogen is supplied to an anode), the ACV1 30 is opened, the ACV2 40 is closed, and the ASV 50 operates in the first mode to store the air of the cathode in the air tank 70 and when the ambient air is supplied to the cathode, the ACV1 30 is kept open, the ACV2 40 is opened, and the ASV 50 operates in the second mode to discharge the ambient air supplied to the cathode through the exhaust line to the outside.

When the controller 90 receives a start command of the fuel cell system from a user, the controller 90 may control a hydrogen supplier 100 to supply the hydrogen to the fuel cell stack 200. In this example, the hydrogen supplier 100 may include a fuel block valve (FBV) 110, a fuel supply valve (FSV) 120, a fuel ejector (FEJ) 130, a fuel pressure sensor (FP10) 140, a fuel-line purge valve (FPV) 150, a fuel-line water trap (FWT) 160, a fuel-line level sensor (FL20) 170, and a fuel-line drain valve (FDV) 180.

The FBV 110 serves to block the hydrogen supplied to the fuel cell stack 200.

The FSV 120 serves to regulate a hydrogen pressure supplied to the fuel cell stack 200.

The FEJ 130 serves to recycle the hydrogen of the anode in the fuel cell stack 200.

The FP10 140, which is a pressure sensor, serves to measure the hydrogen pressure supplied to the fuel cell stack 200.

The FPV 150 serves to discharge condensate and impurities of the anode in the fuel cell stack 200.

The FWT 160 serves to store the condensate of the anode in the fuel cell stack 200.

The FL20 170, which is a water level sensor, serves to measure a water level of the condensate stored in the FWT 160.

The FDV 180 serves to discharge the condensate stored in the FWT 160.

The controller 90 may start a process of reducing the concentration of hydrogen in the cathode of the fuel cell stack 200 when the hydrogen is supplied to the fuel cell stack 200.

The controller 90 may start the process of reducing the concentration of hydrogen in the cathode of the fuel cell stack 200 based on the measured value of the concentration sensor 20. When the concentration of hydrogen in the cathode of the fuel cell stack 200 measured by the concentration sensor 20 exceeds the reference concentration (e.g., 1%), the controller 90 may start the process of reducing the concentration of hydrogen in the cathode of the fuel cell stack 200.

For reducing the concentration of hydrogen in the cathode of the fuel cell stack 200, the controller 90 may allow the ACV1 30 to be opened, allow the ACV2 40 to be closed, and allow the ASV 50 to operate in the first mode. Then, the controller 90 may operate the air compressor 60 to store the air (including the hydrogen) inside the cathode of the fuel cell stack 200 in the air tank 70.

When the pressure of the air tank 70 exceeds the reference pressure, the controller 90 may open the AEV 80 to allow the pressure of the air tank 70 to be lowered (e.g., 7 to 10%).

When an embodiment of the present disclosure is applied to a bus or a truck, when the concentration of the hydrogen in the cathode of the fuel cell stack 200 is reduced, the controller 90 may open the AEV 80 to lower the pressure of the air tank 70 to a threshold valve, in consideration that the air tank 70 always maintains an appropriate pressure. In other words, the controller 90 may secure a space in the air tank 70 in advance to store the air of the cathode of the fuel cell stack 200.

When the ambient air is supplied to the cathode of the fuel cell stack 200, the controller 90 may allow the ASV 50 to operate in the second mode, while the ACV 1 is kept opened and the ACV 2 is opened, to discharge the air supplied to the cathode through the exhaust line to the outside. The controller 90 may further control an air compressor (not shown) for supplying the ambient air to the cathode of the fuel cell stack 200.

Figure 2:
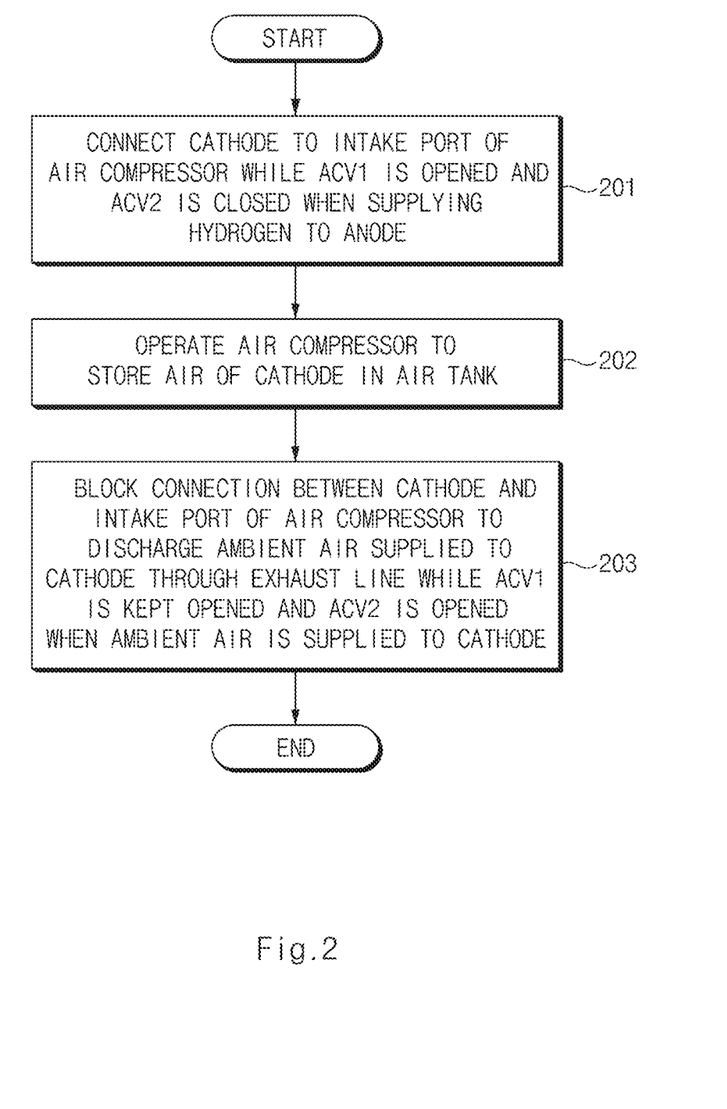
FIG. 2 is a flow chart for a method of reducing an exhaust hydrogen concentration in a fuel cell system according to an embodiment of the present disclosure.

FIG. 2 is a flowchart of a method of reducing an exhaust hydrogen concentration in a fuel cell system according to an embodiment of the present disclosure.

First, when hydrogen is supplied to the anode, the controller 90 connects the cathode to the intake port of the air compressor 60 in 201, while ACV1 30 is opened and ACV2 40 is closed.

Thereafter, the controller 90 operates the air compressor 60 to store the air of the cathode in the air tank 70 in 202. In this example, the air tank 70 is connected to an exhaust port of the air compressor 60.

Then, when the ambient air is supplied to the cathode, the controller 90 blocks the connection between the cathode and the intake port of the air compressor 60 to discharge the ambient air supplied to the cathode through the exhaust line in 203 while ACV1 30 is kept opened and ACV2 40 is opened.

Figure 3:
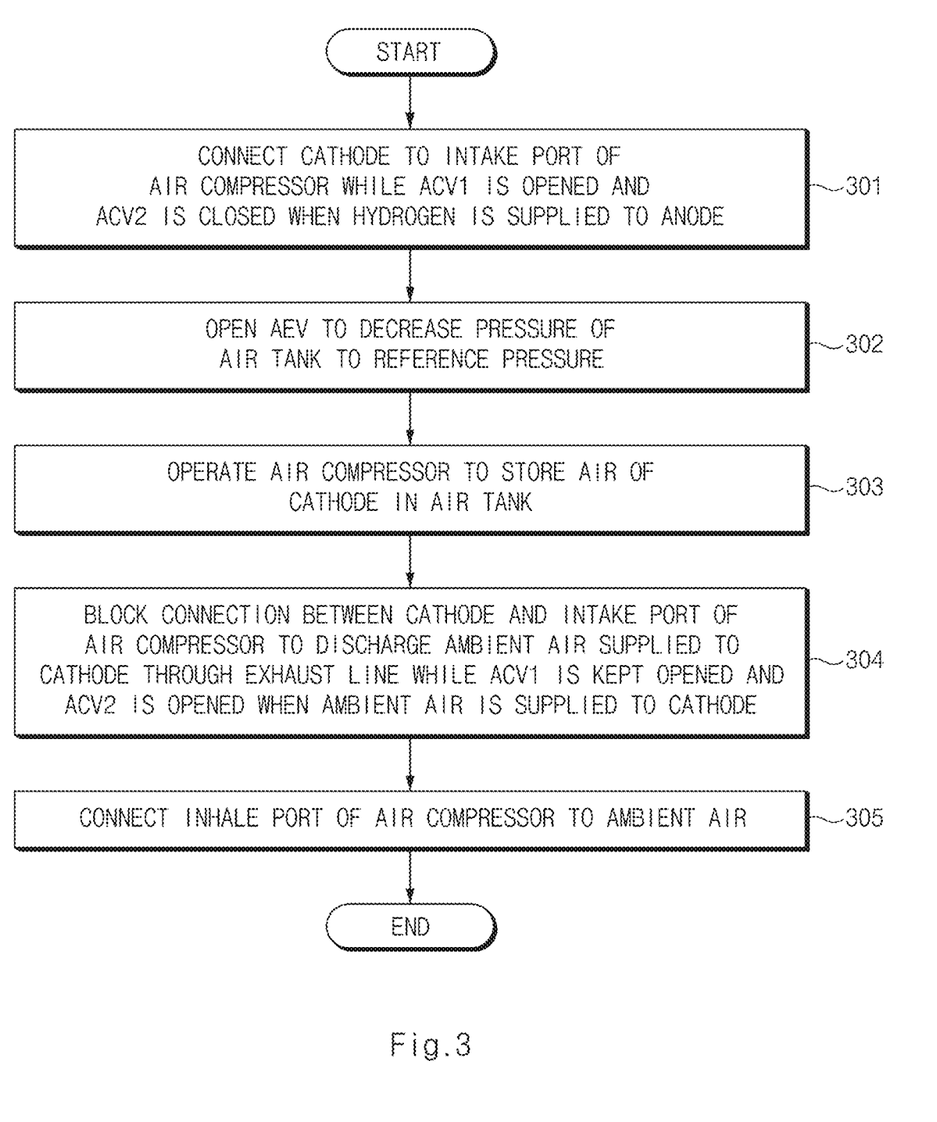
FIG. 3 is a flow chart for a method of reducing an exhaust hydrogen concentration in a fuel cell system according to another embodiment of the present disclosure.

FIG. 3 is a flowchart for a method of reducing an exhaust hydrogen concentration in a fuel cell system according to another embodiment of the present disclosure, and shows a case applied to a bus or a truck.

First, when hydrogen is supplied to the anode, the controller 90 connects the cathode to the intake port of the air compressor 60 in 301, while ACV1 30 is opened and ACV2 is closed.

Thereafter, the controller 90 opens the AEV 80 to lower a pressure of the air tank to the reference pressure in 302.

Then, the controller 90 operates the air compressor 60 to store the air of the cathode in the air tank 70 in 303. The air stored in the air tank 70 may be used in a system requiring compressed air (e.g., a brake system) in a bus or a truck.

Thereafter, when the ambient air is supplied to the cathode, the controller 90 blocks the connection between the cathode and the intake port of the air compressor 60 to discharge the ambient air supplied to the cathode through the exhaust line in 304 while ACV1 30 is kept opened and ACV2 40 is opened.

Then, the controller 90 connects the intake port of the air compressor 60 to the ambient air in 305. In this example, the air compressor 60 is a module for generating compressed air in a bus or truck. The controller 90 connects the intake port of the air compressor 60 to ambient air to perform its original function.

Figure 4:
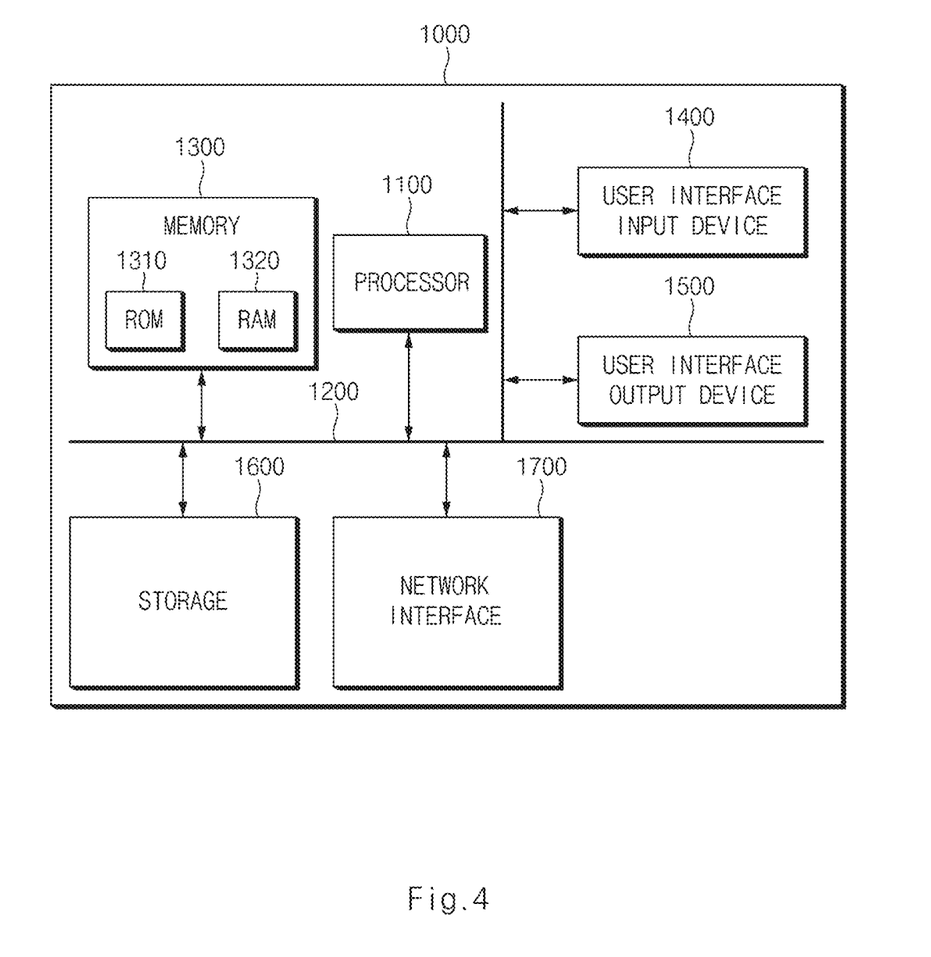
FIG. 4 is a block diagram illustrating a computing system for executing a method of reducing an exhaust hydrogen concentration in a fuel cell system according to an embodiment of the present disclosure.

FIG. 4 illustrates a computing system executing a method of reducing an exhaust hydrogen concentration in a fuel cell system according to an embodiment of the present disclosure.

Referring to FIG. 4, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (i.e., the memory 1300 and/or the storage 1600) such as a RAM memory, a flash memory, a ROM memory, an EPROM memory, an EEPROM memory, a register, a hard disk, a removable disk, or a CD-ROM. The storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

In the apparatus for reducing the exhaust hydrogen concentration in the fuel cell system and the method thereof according to an embodiment of the present disclosure, when the hydrogen is supplied to the fuel cell stack, the ACV adjacent to the inlet of the cathode may be opened, the ACV adjacent to the outlet of the cathode may be closed, and the ASV may be operated in the first mode to store the air of the cathode in the air tank. When the ambient air is supplied to the cathode, the ACV adjacent to the inlet of the cathode may be kept opened, the ACV adjacent to the outlet of the cathode may be opened, and the ASV may be operated in the second mode to discharge the ambient air, which is supplied to the cathode, to the outside through the exhaust line, thereby reducing the hydrogen concentration in the air discharged through the exhaust line.

Therefore, the embodiments of the present disclosure are provided to explain the spirit and scope of the present disclosure, but not to limit them, so that the spirit and scope of the present disclosure is not limited by the embodiments. The scope of the present disclosure should be construed based on the accompanying claims, and all the technical ideas within the scope equivalent to the claims should be included in the scope of the present disclosure.

What is claimed is:

1. An apparatus for reducing an exhaust hydrogen concentration in a fuel cell system, the apparatus comprising:
   a first air cut-off valve (ACV) configured to block ambient air supplied to a cathode;

a second ACV configured to block exhaust hydrogen discharged from the cathode;

an air suction valve (ASV) configured to operate in a first mode, which connects the cathode and an intake port of an air compressor, and in a second mode, which blocks connection between the cathode and the intake port of the air compressor; and a controller configured to operate the ASV in the first mode to store air of the cathode in an air tank while the first ACV is opened and the second ACV is closed when hydrogen is supplied to an anode, and to operate the ASV in the second mode to discharge the ambient air supplied to the cathode through an exhaust line while the first ACV is kept opened and the second ACV is opened when the ambient air is supplied to the cathode, wherein the ASV is further configured to connect the ambient air to the intake port of the air compressor, and wherein the air compressor sucks the air of the cathode to store the air in the air tank when the ASV operates in the first mode.

2. The apparatus of claim 1, wherein the controller controls the air compressor to suck the air of the cathode for a reference time.

3. The apparatus of claim 1, wherein the controller controls the air compressor to store the ambient air in the air tank.

4. The apparatus of claim 1, further comprising:
a concentration sensor located in the exhaust line connecting the cathode to the second ACV to measure a concentration of hydrogen in the cathode.

5. The apparatus of claim 4, wherein the controller allows the ASV to be opened to lower the concentration of hydrogen in the cathode when the concentration of hydrogen measured by the concentration sensor exceeds a reference concentration.

6. The apparatus of claim 1, further comprising:
a pressure sensor for measuring a pressure of the air tank; and
an air exhaust valve (AEV) for discharging air in the air tank to outside the air tank.

7. The apparatus of claim 6, wherein the controller allows the AEV to be opened to lower the pressure of the air tank when the pressure measured by the pressure sensor exceeds a reference pressure.

8. The apparatus of claim 1, wherein the air compressor sucks the air of the cathode and the ambient air to store the air of the cathode and the ambient air in the air tank when the ASV operates in the first mode, and sucks the ambient air to store the ambient air in the air tank when the ASV operates in the second mode.

9. An apparatus for reducing an exhaust hydrogen concentration in a fuel cell system, the apparatus comprising:
a first air cut-off valve (ACV) configured to block ambient air supplied to a cathode;

a second ACV configured to block exhaust hydrogen discharged from the cathode;

an air suction valve (ASV) configured to operate in a first mode, which directly connects the cathode and an intake port of an air compressor, and in a second mode, which blocks the direct connection between the cathode and the intake port of the air compressor; and a controller configured to operate the ASV in the first mode to store air of the cathode in an air tank while the first ACV is opened and the second ACV is closed when hydrogen is supplied to an anode, and to operate the ASV in the second mode to discharge the ambient air supplied to the cathode through an exhaust line while the first ACV is kept opened and the second ACV is opened when the ambient air is supplied to the cathode, wherein the ASV is further configured to directly connect the ambient air to the intake port of the air compressor.

* * * * *